(12) United States Patent
Seidl

(10) Patent No.: US 8,607,962 B2
(45) Date of Patent: Dec. 17, 2013

(54) DEVICE FOR ORIENTING OBJECTS

(75) Inventor: Andreas Seidl, Donaustauf (DE)

(73) Assignee: Krones AG, Neutraubling (DE)

( * ) Notice: Subject to any disclaimer, the term of this patent is extended or adjusted under 35 U.S.C. 154(b) by 80 days.

(21) Appl. No.: 13/269,727

(22) Filed: Oct. 10, 2011

(65) Prior Publication Data

US 2012/0085620 A1   Apr. 12, 2012

(30) Foreign Application Priority Data

Oct. 12, 2010   (DE) .......................... 10 2010 042 333

(51) Int. Cl.
*B65G 47/256* (2006.01)

(52) U.S. Cl.
USPC ...................................... 198/398; 198/464.2

(58) Field of Classification Search
USPC ........... 198/398, 401, 396, 407, 464.1, 464.2, 198/464.3, 580
See application file for complete search history.

(56) References Cited

U.S. PATENT DOCUMENTS

| | | | | |
|---|---|---|---|---|
| 4,047,636 A * | 9/1977 | List | | 221/161 |
| 4,079,830 A | 3/1978 | Winberg et al. | | |
| 5,065,852 A * | 11/1991 | Marti | | 198/392 |
| 5,236,077 A | 8/1993 | Hoppmann et al. | | |
| 6,049,189 A * | 4/2000 | Markus et al. | | 318/802 |
| 7,322,458 B1 * | 1/2008 | McDonald et al. | | 198/389 |
| 7,337,893 B2 * | 3/2008 | Charpentier | | 198/454 |
| 7,743,904 B2 * | 6/2010 | Monti | | 198/396 |
| 2006/0203250 A1 | 9/2006 | Regn et al. | | |
| 2010/0155194 A1 * | 6/2010 | Schafer | | 198/357 |

FOREIGN PATENT DOCUMENTS

| | | |
|---|---|---|
| AT | 506149 A1 | 6/2009 |
| AT | 506149 T | 5/2011 |
| DE | 2744804 A1 | 4/1978 |
| DE | 10133805 A1 | 1/2003 |
| DE | 102005011667 A1 | 9/2006 |
| DE | 102006052116 A1 | 5/2008 |
| DE | 102007049009 A1 | 4/2009 |
| DE | 102009009866 A1 | 8/2010 |
| DE | 102009016593 A1 | 10/2010 |
| EP | 1325877 A2 | 7/2003 |
| EP | 1335870 A1 | 8/2003 |
| EP | 1650143 A1 | 4/2006 |
| EP | 1950153 A2 | 7/2008 |

OTHER PUBLICATIONS

European Search Report for 11179350.1, dated Jan. 23, 2012.
Search Report for DE 10 2010 042 333.5, dated Mar. 15, 2011.

* cited by examiner

*Primary Examiner* — Gene Crawford
*Assistant Examiner* — Keith R Campbell
(74) *Attorney, Agent, or Firm* — Marshall, Gerstein & Borun LLP

(57) ABSTRACT

A device and a method for orienting objects, in particular preforms for the manufacture of plastic containers, where the preforms are handed over to the entry side of an orientation section via a feeding conveyor, and a discharge means is provided which returns non-oriented preforms via a return feeder. For a constructively simple and quick return, the discharge means is connected directly with the entry side of the orientation section via the return conveyor.

23 Claims, 3 Drawing Sheets

DEVICE FOR ORIENTING OBJECTS

CROSS-REFERENCE TO RELATED APPLICATION

The present application claims the benefit of priority of German Application No. 102010042333.5, filed Oct. 12, 2010. The entire text of the priority application is incorporated herein by reference in its entirety.

FIELD OF THE DISCLOSURE

The disclosure relates to a device and a method for orienting objects, in particular preforms for the manufacture of plastic containers.

BACKGROUND

A device and a method of this type are known from EP 1 335 870. Such orientation devices serve to bring objects or preforms, respectively, that are manufactured in a blow-molding machine or other suited devices, into a certain orientation to then forward them to subsequent plants for further processing in this oriented position. These orientation devices contain an orientation section on which the preforms or objects, respectively, have the opportunity of adopting a certain orientation by themselves, optionally supported by mechanical actions and the action of gravity. However, the problem in these orientation sections is that it is not always possible to bring all of the charged preforms into the desired orientation. The known orientation section therefore contains a discharge means by which non-oriented preforms are removed from the conveyed stream. As the lack of orientation is in most cases not due to quality defects of the preforms, the discharged preforms are subsequently returned for a new passage through the orientation section. The known device contains a discharge means which contains a shaft into which the non-oriented preforms are discharged. The shaft ends above a return conveyor belt which conveys the preforms back into a collecting vessel which is filled from the preceding manufacturing machine of the preforms. A feeding conveyor feeds the preforms from this storage tank to the entry side of the orientation section where returned preforms and newly manufactured preforms are placed together into the orientation section by the same conveyor. In practice, however, manufacturing machines or storage tanks of the preforms often must be placed at a great distance to the orientation section, so that the conveying distances for returning the preforms are long.

SUMMARY OF THE DISCLOSURE

One aspect of the disclosure is to provide a device and a method which permits a constructively not very complicated return of non-oriented preforms, independent of the spatial distance between the orientation section and the preceding manufacturing machine or the storage tank.

By the embodiment according to the disclosure, the return feeder is decoupled from the supply feeder for the new objects that did not yet pass the orientation section, and the non-oriented discharged preforms are directly fed to the entry side of the orientation section. In this manner, the preforms are only returned essentially over the length of the orientation section, so that the device can be constructively simplified. However, there are also procedural advantages as discharged preforms very quickly reach the entry side of the orientation section, so that, for example when the machine is switched off or the objects to be oriented are changed, one does not first have to wait until all discharged objects have covered the complete distance to the manufacturing machine or to its storage tank.

It is particularly advantageous if the discharge means comprises a collecting vessel, so that the preforms are returned not before a sufficient number or quantity of discharged preforms is present. By this, a defined quantity is provided which always ensures, in connection with the control of the feeding conveyor, a constant feed of preforms to the orientation section, preferably linearly depending on the machine's performance.

To receive the two outlet sides of the feeding conveyor and the return conveyor, the entry side of the orientation section preferably contains a feed hopper to achieve a controlled charge of the preforms.

If the device according to the disclosure runs to capacity, i.e. the feeding conveyor supplies as many preforms per time unit as the orientation section can handle, it is advantageous to provide a signal transmitter which detects the presence of preforms coming from the return conveyor in the region of the entry side of the orientation section and reduces the throughput (speed/number of preforms) of the feeding conveyor corresponding to the supplied quantity of returned preforms.

A further signal transmitter in the region of the collecting vessel of the discharge means is equally advantageous and controls the return conveyor, so that it has to be put in operation not before a sufficient number of non-oriented preforms is located in the collecting vessel.

The device according to the disclosure offers the further advantage that supplied preforms of the orientation section can be withdrawn upstream of the discharge means. This is particularly suitable when preforms are changed (other shape, other size, or the like), as thus one does not have to wait until the complete orientation section including the return feeder has run empty. This possibility, however, can also be employed in devices for orienting objects where the return conveyor is not directly connected to the entry side of the orientation section.

The withdrawal means is particularly effective if it is provided in the region between the feeding conveyor and the orientation section and includes a distributing guide by means of which the incoming stream of preforms is diverted, and for example directed into a receptacle.

In a constructively simple manner, the distributing guide is embodied as an adjustable bottom of a feed hopper.

BRIEF DESCRIPTION OF THE DRAWINGS

One embodiment of the disclosure will be illustrated below more in detail with reference to the drawings. In the drawings.

DETAILED DESCRIPTION OF THE PREFERRED EMBODIMENT

Figure 1:
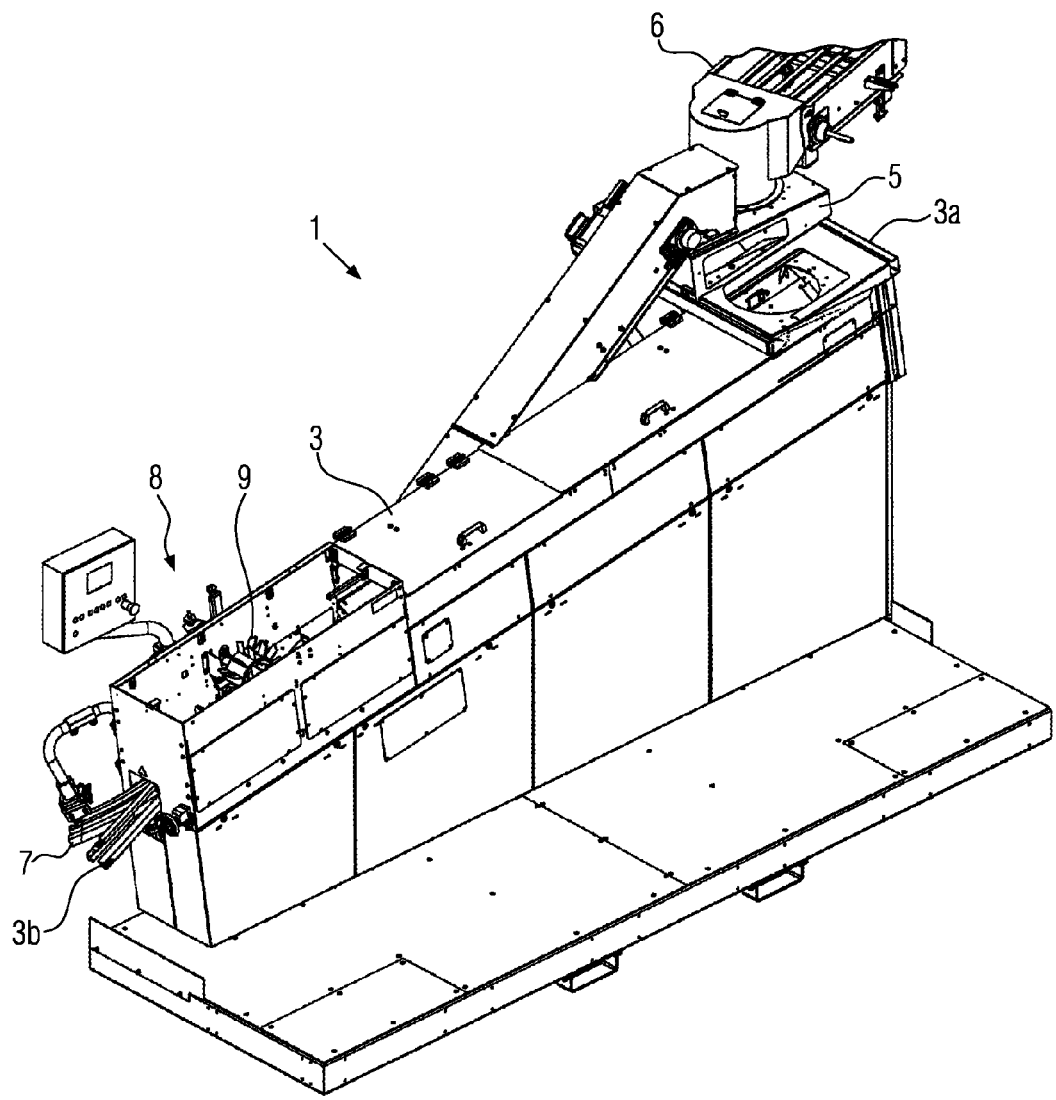
FIG. 1 shows a front view of a device according to the disclosure.
Figure 2:
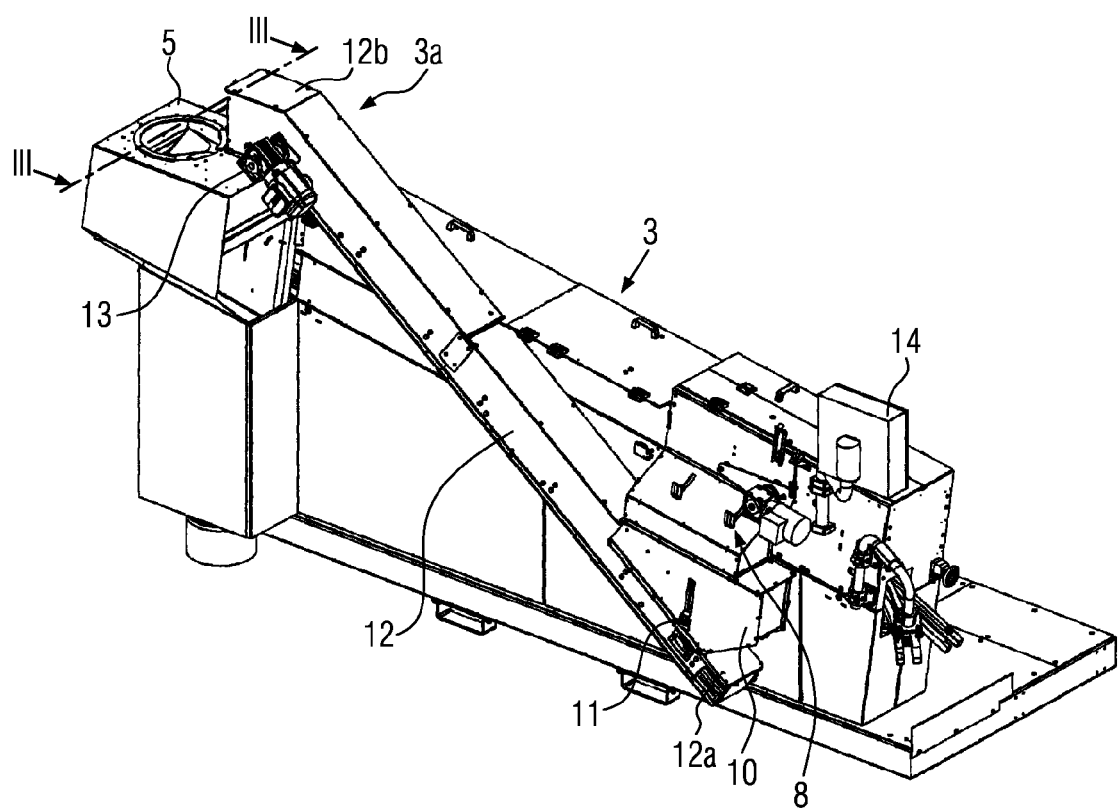
FIG. 2 shows the rear of the device according to FIG. 1.
Figure 3:
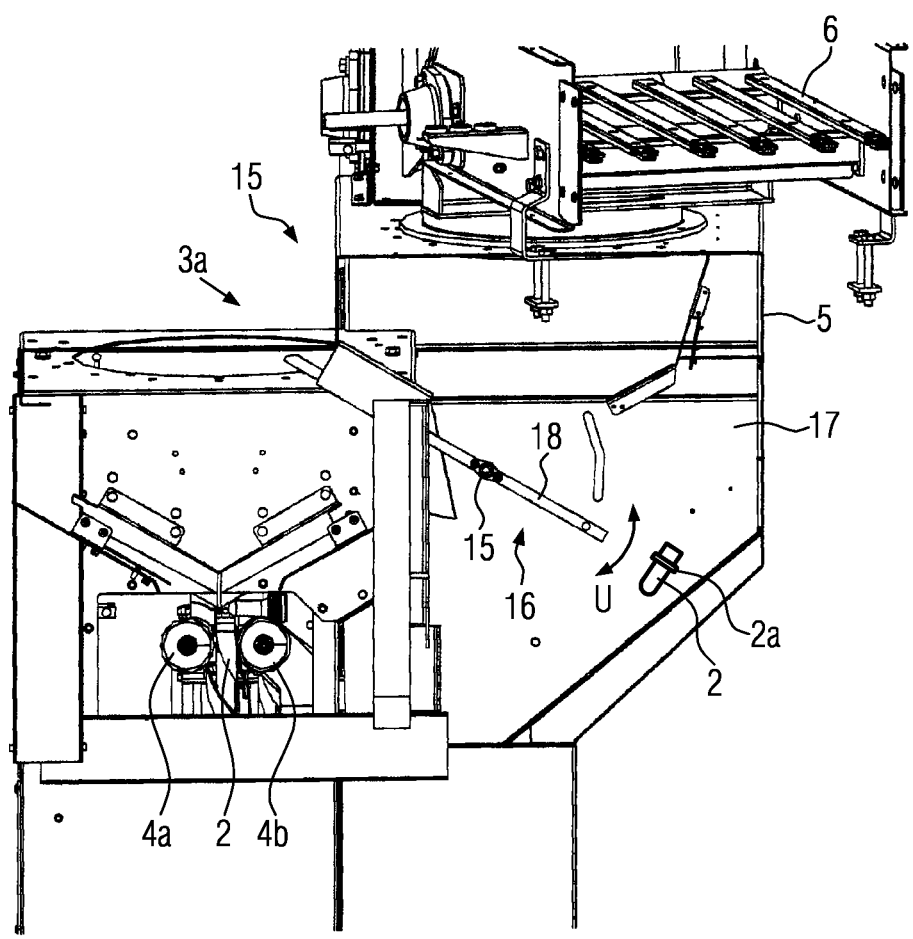
FIG. 3 shows an enlarged sectional representation III-III of FIG. 2.

FIGS. 1 to 3 show, in different representations, a device 1 for orienting objects which are, in the present embodiment, preforms 2 (FIG. 3) as they are provided in the manufacture of plastic containers, for example plastic bottles, as so-called "preforms" and supplied to a blow molding machine which produces containers from the preforms 2, for example plastic bottles. The principles of the present application, however, can also be employed for handling other objects.

The device 1 contains an orientation section 3 which is of a conventional construction and adapted to the sorting objects, and which is embodied, for example, for sorting preforms 2 as roller sorters of a well-known type. Roller sorters contain two rollers or rows of rollers 4a, 4b which face each other at an axial distance which the preform 2 to be sorted can only enter in a certain orientation and in which it is, for example, secured against slipping through by the neck collar 2a usually present in preforms.

The orientation section 3 extends obliquely downwards between its entry side 3a and its outlet side 3b, so that gravity supports the orientation and the conveyance of the preforms 2. At the entry side 3a, there is a feed hopper 5 into which the preforms 2 arriving on a feeding conveyor 6 are introduced into the orientation section 3. The feeding conveyor 6 preferably directly connects a manufacturing device for preforms with the entry side 3a of the orientation section 3; however, it is also possible to transport the preforms from a storage by means of the feeding conveyor 6.

The preforms 2 transported from the feeding conveyor 6 reach the orientation section 3 via the hopper 5 and are there oriented in the manner outlined at the top and leave the outlet side 3b of the orientation section 3 via a conveyor 7 which forwards them to further processing, i.e. in particular into a blow molding machine.

A discharge means 8 is provided at the outlet side 3b of the orientation section 3. The discharge means 8 preferably contains a blow-out means as well as other means which are suited for removing non-oriented preforms from the conveyed stream of the oriented preforms. In the shown embodiment, a take-off means 9 in the form of a so-called "kicker wheel" is represented by means of which preforms that are inserted one into the other or adhere to each other in any other manner can be separated. The non-oriented preforms which settle on the flow of oriented preforms are then blown into a collecting vessel 10 represented in FIG. 2 by the blow-out means 8. They are first collected there until a predetermined number of preforms has been collected in the container 10. A signal transmitter 11 is preferably provided which generates a signal when this predetermined number or quantity is reached. The signal transmitter 11 preferably is a light barrier, but it can also be any type of counting means which counts the blown-out preforms, or it can serve the desired purpose in another way.

The discharge means 8 is connected to a return conveyor 12, the entry side 12a of which begins at the bottom side of the collecting vessel 10 and an outlet opening provided there. The return conveyor 12 leads obliquely upwards from the discharge means 8 directly to the entry side 3a of the discharge section and preferably also ends with its outlet side 12b in the feed hopper 5 there. In this manner, the non-oriented and accordingly discharged preforms and the preforms transported by the feeding conveyor 6 get into the orientation section 3 together and in a mixed manner.

A further signal transmitter 13, again preferably a light barrier, is associated to the return conveyor 12, and with it, one can detect whether preforms 2 are located in the return conveyor 12.

The signal transmitters 11, 13 are connected to a controlling system 14 which can control the complete device 1.

By the further signal transmitter 13, problems are avoided when the orientation means 3 is used to capacity, where with this use to capacity, the number of preforms transported by the feeding conveyor 6 essentially corresponds to the number of preforms that can be processed by the orientation means 3.

By the further sensor 13, the presence of preforms coming from the return conveyor 12 can be detected in the region of the entry side 3a, in particular in the region of the feed hopper 5. According to the signal of this signal transmitter 13, the speeds of the feeding conveyor 6 and/or the return conveyor 12 can then be adapted to each other such that the maximum capacity of the orientation section 3 is not exceeded. The simplest way of controlling is, for example, to throttle the speed of the feeding conveyor 6 as soon as the signal transmitter 13 signals the presence of additional preforms. Preferably, the feeding conveyor 6 is slowed down exactly by the output provided by the return conveyor 12.

However, it is also possible to use the signals of the first signal transmitter 11 for such a control when the speed of the return conveyor 12 and the number of preforms located in the collecting vessel 10 is known.

The signals of the signal transmitters 11 and 13 are to this end transmitted to the controlling system 14 which simultaneously performs the overall control of the device according to the disclosure 1 and can, for example, occasion an adaptation to differently shaped preforms or preforms of different dimensions.

As is represented in particular in FIG. 3, a withdrawal device 15 is furthermore provided by means of which incoming preforms 2 can be removed from the device 1 earlier, so that the times required for the changeover from one type of preform to another type of preform are reduced as the preforms do no longer have to run through the complete system. The means 15 can be particularly advantageously employed with the device according to the disclosure, but it can also be used for orientation sections with a conventional return feeder.

The withdrawal means 15 is preferably located between the feeding conveyor 6 and the entry side 3a of the orientation section 3, and in the represented embodiment, it is embodied like a distributing guide 16 which selectively directs the preforms from the feeding conveyor 6 into the orientation section 3, or from the feeding conveyor 6 into a collecting means 17. The collecting means 17 can be a conveyor or, as represented, a receptacle. The distributing guide 16 contains an adjustable slide 18 which can be swiveled via a horizontal swivel pin 19 essentially arranged in the center of the slide 18 in the direction of the double arrow U.

In the position shown in FIG. 3, the slide 18 is in a position in which the preforms 2 are directed into the receptacle, while the entry to the orientation section 3 is blocked. When the distributing guide 16 is operated, the slide 18, however, will form the bottom of the feed hopper 5, block the entry to the receptacle 17, and release the entry to the orientation section 3. Suitably, locking means (not drawn) are provided to lock the distributing guide 16 in its respective positions. Equally, so-called clearance monitoring light barriers can ensure trouble-free switching.

In variation to the described and drawn embodiment, the constructive conditions of the device can be adapted to the characteristics of the objects to be handled. Instead of a roller sorter, for example other sorter constructions can be employed. The return conveyor can contain belt bands or other conveyors. The signal transmitters can also comprise other suited sensors. Moreover, the described functions of the monitoring of the presence and the conveying motion of the returned containers can be performed by each of the signal transmitters alone, or by both signal transmitters together.

The invention claimed is:

1. Device for orienting objects, comprising an orientation section on the entry side of which the objects are charged in a non-oriented manner by a feeding conveyor, a discharge means and a return conveyor for discharging and returning non-oriented objects, and the return conveyor directly connecting the discharge means with the entry side of the orientation section, wherein the discharge means comprises a collecting vessel having a signal transmitter to control the return conveyor, so that the return conveyor is put in operation not before a sufficient number of non-oriented objects is located in the collecting vessel.

2. The device according to claim 1, wherein the collecting vessel for discharged objects is connected with the entry side of the return conveyor.

3. The device according to claim 1, and a feed hopper is associated to the entry side of the orientation section.

4. The device according to claim 3, wherein an outlet side of the return conveyor and the feeding conveyor end in the feed hopper.

5. The device according to claim 1, and at least one signal transmitter is provided which detects the presence of objects coming from the return conveyor in the region of the entry side of the orientation section.

6. The device according to claim 5, and a controlling system is provided which controls the feed rate of the feeding conveyor depending on a signal of the at least one signal transmitter.

7. The device according to claim 2, and at least one signal transmitter is provided which detects the presence of discharged objects in the region of the collecting vessel.

8. The device according to claim 7, and a controlling system is provided which controls the return conveyor depending on a signal of the at least one signal transmitter.

9. The device according to claim 1, and wherein in the direction of feed upstream of the discharge means, a withdrawal means for objects supplied on the feeding conveyor is provided.

10. The device according to claim 9, wherein the withdrawal means contains a distributing guide arranged between the feeding conveyor and the orientation section which connects the feeding conveyor selectively with the orientation section or with a collecting means.

11. The device according to claim 10, wherein the collecting device contains a receptacle arranged in the region of the entry side of the orientation means.

12. The device according to claim 10, wherein the distributing guide contains an adjustable bottom of a feed hopper into which the feeding conveyor and the return conveyor end.

13. Method for orienting objects, comprising charging objects in a non-oriented manner via a feeding conveyor on the entry side of an orientation section, discharging and returning non-oriented objects, and objects being directly returned to the orientation section by a return conveyor that is put in operation not before a sufficient number of non-oriented objects is located in a collecting vessel.

14. The method according to claim 13, and adapting the speed of the feeding conveyor to one of the number, the speed, and a combination thereof of the returned objects.

15. The method according to claim 13, and collecting the discharged objects before they are returned.

16. The device according to claim 1, where the objects are preforms for the manufacture of plastic containers.

17. The method according to claim 13, wherein the objects are preforms for the manufacture of plastic containers.

18. Method for orienting objects via a device including an orientation section having an entry side, a return conveyor, which is put in operation not before a sufficient number of non-oriented objects is located in a collecting vessel, and a discharge means, the return conveyor being one of directly connected to the entry side of the orientation section or not directly connected to the entry side of the orientation section, comprising charging objects in a non-oriented manner via a feeding conveyor in the entry side of an orientation section.

19. Method of claim 18, further comprising withdrawal of charged objects of the orientation section upstream of the discharge means.

20. Method of claim 18, wherein in charging objects in a non-oriented manner, the objects include preforms for the manufacture of plastic containers.

21. Device for orienting objects, comprising an orientation section on the entry side of which the objects are charged in a non-oriented manner by a feeding conveyor, a discharge means and a return conveyor for discharging and returning non-oriented objects, and the return conveyor directly connecting the discharge means with the entry side of the orientation section, wherein the discharge means comprises a collecting vessel for discharged objects which is connected with the side entry of the return conveyor, wherein a feed hopper is associated to the entry side of the orientation section and wherein at least one signal transmitter is provided which detects the presence of objects coming from the return conveyor in the region of the entry side of the orientation section.

22. Device for orienting objects, comprising an orientation section on the entry side of which the objects are charged in a non-oriented manner by a feeding conveyor, a discharge means and a return conveyor for discharging and returning non-oriented objects, and the return conveyor directly connecting the discharge means with the entry side of the orientation section, wherein the discharge means comprises a collecting vessel for discharged objects which is connected with the entry side of the return conveyor, wherein a feed hopper is associated to the entry side of the orientation section and wherein at least one signal transmitter is provided which detects the presence of discharged objects in the region of the collecting vessel.

23. Device for orienting objects, comprising an orientation section on the entry side of which the objects are charged in a non-oriented manner by a feeding conveyor, a discharge means and a return conveyor for discharging and returning non-oriented objects and a collecting means, wherein in the direction of feed upstream of the discharge means, a withdrawal means for objects supplied on the feeding conveyor is provided, and wherein the withdrawal means contains a distributing guide arranged between the feeding conveyor and the orientation section which connects the feeding conveyor selectively with the orientation section or with the collecting means.

* * * * *